US010069151B2

(12) United States Patent
Na et al.

(10) Patent No.: US 10,069,151 B2
(45) Date of Patent: Sep. 4, 2018

(54) DE-MINERALIZER FOR FUEL CELL AND MANUFACTURING METHOD OF SAME (71) Applicants: Hyundai Motor Company, Seoul (KR); Kia Motors Corporation, Seoul (KR)

(72) Inventors: Sung Wook Na, Yongin-si (KR); Hun Woo Park, Namyangju-si (KR); Chi Myung Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 217 days.

(21) Appl. No.: 14/933,805

(22) Filed: Nov. 5, 2015

(65) Prior Publication Data
US 2016/0351923 A1 Dec. 1, 2016

(30) Foreign Application Priority Data
May 29, 2015 (KR) .................. 10-2015-0075817

(51) Int. Cl.
H01M 8/02 (2016.01)
H01M 8/04044 (2016.01)
H01M 8/04029 (2016.01)

(52) U.S. Cl.
CPC ... *H01M 8/04044* (2013.01); *H01M 8/04029* (2013.01); *H01M 2250/20* (2013.01); *Y02P 70/56* (2015.11); *Y02T 90/32* (2013.01)

(58) Field of Classification Search
CPC .................. H01M 8/04044; H01M 8/04029
See application file for complete search history.

(56) References Cited

U.S. PATENT DOCUMENTS

| 4,882,056 | A | * | 11/1989 | Degen | .................. | B01D 24/001 |
| | | | | | | 210/490 |
| 5,106,501 | A | * | 4/1992 | Yang | ...................... | B01D 24/04 |
| | | | | | | 210/266 |
| 9,960,436 | B2 | * | 5/2018 | Park | .................. | H01M 8/04029 |
| 2001/0052487 | A1 | * | 12/2001 | King | ...................... | A01N 59/16 |
| | | | | | | 210/167.11 |
| 2004/0164030 | A1 | * | 8/2004 | Lowe | ...................... | A61F 2/013 |
| | | | | | | 210/767 |
| 2006/0175262 | A1 | * | 8/2006 | Martin | .................. | B01D 15/00 |
| | | | | | | 210/670 |

(Continued)

FOREIGN PATENT DOCUMENTS

JP 2005071709 A * 3/2005
JP 2006-507105 A 3/2006

(Continued)

*Primary Examiner* — Jonathan G Jelsma
(74) *Attorney, Agent, or Firm* — McDermott Will & Emery LLP (57) ABSTRACT A de-mineralizer for a fuel cell includes a cartridge assembly including an external outer cartridge and an internal inner cartridge installed inside a housing filled with ion resin, wherein at least one of the inner cartridge and the outer cartridge includes an etching network formed with a plurality of fine holes, in which at least one of a size and distribution of the fine holes are formed differently depending on the respective positions based on a vertical flow direction of the cooling water, and a frame formed on an outer circumferential surface of the etching network to support the etching network.

9 Claims, 6 Drawing Sheets

(56) References Cited

U.S. PATENT DOCUMENTS

2011/0129753 A1* 6/2011 Na .................... H01M 8/04044
                                                                                                      429/437

FOREIGN PATENT DOCUMENTS

| | | |
|---|---|---|
| JP | 2006-130356 A | 5/2006 |
| KR | 10-2006-0114700 A | 11/2006 |
| KR | 10-2006-0133937 A | 12/2006 |
| KR | 10-2011-0061725 A | 6/2011 |
| KR | 10-2011-0061731 A | 6/2011 |
| KR | 10-2012-0016059 A | 2/2012 |
| KR | 10-2012-0137148 A | 12/2012 |

* cited by examiner

DE-MINERALIZER FOR FUEL CELL AND MANUFACTURING METHOD OF SAME

CROSS-REFERENCE TO RELATED APPLICATION

This application claims, under 35 U.S.C. § 119(a), the benefit of priority to Korean Patent Application No. 10-2015-0075817, filed on May 29, 2015 with the Korean Intellectual Property office, the entire contents of which are incorporated herein by reference.

TECHNICAL FIELD

The present disclosure relates to a de-mineralizer for a fuel cell and a method for manufacturing the same. More particularly, it relates to a de-mineralizer for a fuel cell for improving leakage of ion resin in the de-mineralizer and for efficiently improving flow rate distribution of the cooling water, and a method for manufacturing the same.

BACKGROUND

Generally, a fuel cell system applied to a hydrogen fuel cell vehicle is configured to include a fuel cell stack that generates electrical energy from the electrochemical reaction of reaction gas, a hydrogen supply device that supplies hydrogen as a fuel to the fuel cell stack, an air supply device that supplies air containing oxygen as an oxidant required for the electrochemical reaction to the fuel cell stack, and a heat and water management system that releases heat as a byproduct of the electrochemical reaction in the fuel cell stack to the outside, optimally controlling an operating temperature of the fuel cell stack and performing water management functions.

In this configuration, the fuel cell stack generates electrical energy from the electrochemical reaction between hydrogen and oxygen as the reactive gasses, and discharges heat and water as the reaction by-product. Thus, the fuel cell system essentially requires an apparatus that cools the stack.

The heat and water management system includes a de-mineralizer, and the de-mineralizer serves to remove metal ions from the cooling water discharged after circulating through the fuel cell stack for the purposes of extending the life expectancy of the fuel cell and for stabilizing the fuel cell system.

The de-mineralizer of the fuel cell vehicle is located on the stack cooling water loop, and serves to ensure the electric stability of the system through ion-filtering so as to prevent electric shock.

For example, by mounting the ion resin inside the cartridge, the electric conductivity increased by cations/anions present in the stack cooling water are removed and managed to a certain criteria or less, to improve the insulation stability of the vehicle.

Particulate ion resin for substantially filtering ions contained in the cooling water is built in the interior of the de-mineralizer. The cooling water discharged after circulating through the fuel cell stack enters the de-mineralizer and, after the metal ions are removed by its internal ion resin, the cooling water circulates again to the fuel cell stack. Thus, the degree of ions in the stack cooling water, or its electric conductivity, can be appropriately controlled.

Various types of such ionic filters are disclosed in Korean Patent Publication No. 10-2006-0114700, Korean Patent Publication No. 10-2011-0061725, and Korean Patent Publication No. 10-2012-0016059.

Figure 1:
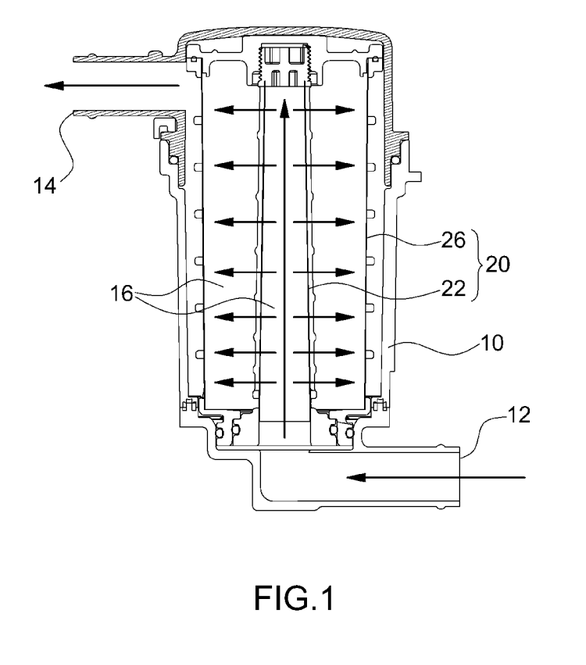
FIG. 1 is a schematic diagram showing a flow direction of the cooling water of a conventional de-mineralizer.
Figure 2A:
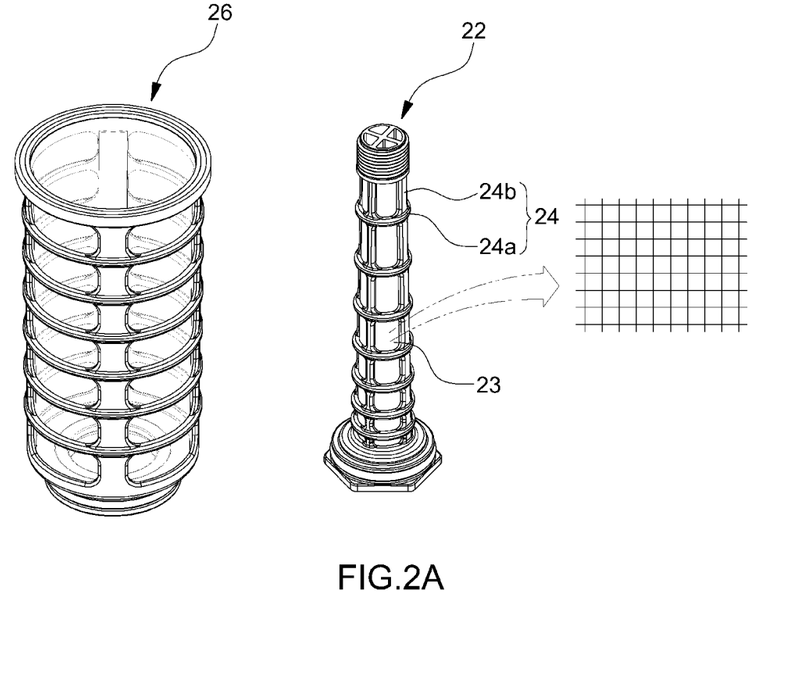
FIG. 2a is diagram showing a cartridge assembly of the conventional de-mineralizer.
Figure 2B:
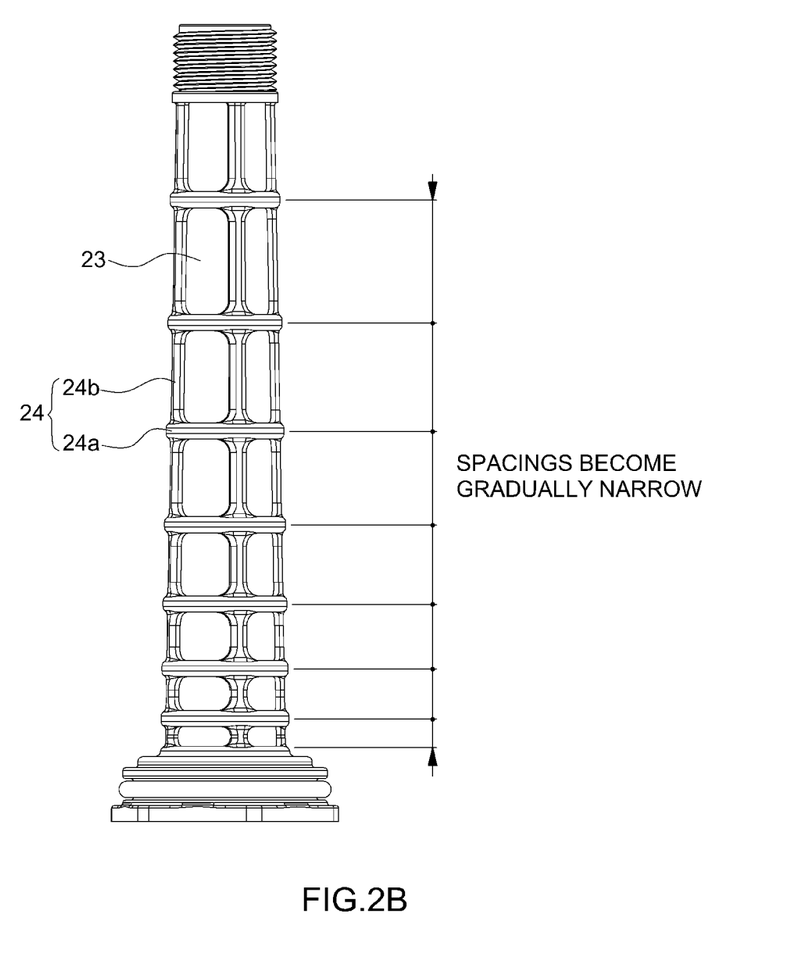
FIG. 2b is a diagram showing an inner cartridge of the conventional cartridge assembly.

FIG. 1 is a schematic diagram that shows a flow direction of the cooling water of the conventional de-mineralizer, FIG. 2a is a diagram that shows a cartridge assembly of the conventional de-mineralizer, and FIG. 2b is a diagram that shows an inner cartridge in the conventional cartridge assembly.

The conventional de-mineralizer is a part that filters the ions contained in the cooling water entering the fuel cell stack to lower the electrical conductivity of the cooling water to a certain level or below. As shown in FIG. 1, the conventional de-mineralizer is configured to include a housing 10 through which the cooling water normally passes, cooling water inlet 12 and outlet 14 through which the cooling water is introduced/discharged into the housing 10, an ion resin 16 that is filled in the housing 10 to filter the ions contained in the cooling water, and a cartridge assembly 20 that supports the ion resin 16 filled in the housing 10 and prevents leakage.

As shown in FIGS. 1 and 2a, the conventional de-mineralizer cartridge assembly 20 is configured to include an inner cartridge 22 disposed inside and an outer cartridge 26 disposed outside.

The inner cartridge 22 is formed by the following procedure. After a general mesh network is rolled in a cylindrical shape and two points of the rolled-mesh network are joined by spot welding, the welded mesh net is seated on the metal mold. Thereafter, the resin is injected at a high pressure, and a frame 24 is molded on the outside of the mesh network 23.

The mesh network 23 is a network formed by arranging wires extending in horizontal and vertical directions at uniform intervals. A burning phenomenon, in which a mesh network burns during spot welding due to being wound in a cylindrical shape, may occur, and the mesh network welding portion is then not joined due to the welding defect. Thus, a phenomenon in which the mesh network overturns and is pushed by the injection pressure during resin injection in the process of seating the mesh network in a metal mold and performing the injection molding of the frame occurs. This causes an injection failure of the frame, and the injection failure of the frame 24 leads to a leakage of ion resin in the filter.

When such leaked ionic resin flows along the cooling water flow path of the stack, the leaked ionic resin blocks a cooling water flow path within a stack separating plate. Thus, the cooling water does not flow and a burning of the stack separating plate occurs.

In addition, as shown in FIG. 2b, the frame 24 of the inner cartridge has a form in which a horizontal frame portion 24a formed outside of the mesh network 23 intersects with a vertical frame portion 24b. The horizontal frame portion 24a has a function of distributing the flow of cooling water, and the vertical frame portion 24b has a function of fixing the mesh network 23.

The horizontal frame portion 24a is arranged by forming a spacing in a pattern where the spacing gradually becomes wider as it goes to the outlet side from the cooling water inlet side, thereby evenly distributing the flow of the cooling water.

Typically, since the pressure of the cooling water inlet side is the highest in the de-mineralizer, the cooling water inlet side has the highest cooling water flow rate, and there is a difference in life expectancy of the ion resin of the inlet side and that of the outlet side. Even if the life expectancy of the output side of the ion resin remains, the filtering efficiency is rapidly lowered when the life expectancy of the inlet side of the ion resin decreases. Thus, in order to prevent such a phenomenon, a uniform distribution of the cooling water is induced through the spacing adjustment of the horizontal frame portion.

However, the conventional ion filter as described above needs to mold a plurality of horizontal frame portions when molding the frame by differentiating the spacing of the horizontal frame portions for the uniform distribution of the flow rate of the cooling water. This may cause an increase in differential pressure of the cooling water, a decline in filtering efficiency and a failure of efficient uniform distribution of the cooling water.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with prior art, and an object thereof is to provide a de-mineralizer for a fuel cell which basically improves leakage of the ion resin in the de-mineralizer which may occur when welding the network using an etching network formed with a network welding pattern for preventing the leakage of ion resin and a fine hole differential pattern for improving the flow rate distribution, and efficiently improves the flow rate distribution of the cooling water in the ion filter, and a method of manufacturing the same.

In one aspect, the present disclosure provides a de-mineralizer for a fuel cell comprising a cartridge assembly which may include an external outer cartridge and an internal inner cartridge installed inside a housing filled with ion resin, wherein at least one of the inner cartridge and the outer cartridge includes an etching network formed with a plurality of fine holes, in which at least one of a size and distribution of the fine holes are formed differently depending on the respective positions of a vertical flow direction of the cooling water, and a frame formed on an outer circumferential surface of the etching network to support the etching network.

In a preferred embodiment, the etching network may be formed in a form that has a pattern in which the size of the fine holes increases in the vertical flow direction of the cooling water in the cartridge assembly.

In another preferred embodiment, the etching network may be formed in a form in which the distribution of the fine holes having the same size increases in the vertical flow direction of the cooling water in the cartridge assembly.

In still another preferred embodiment, the etching network may be formed by winding a plate-shaped thin plate member having a plurality of perforated fine holes in a cylindrical shape, and as the thin plate member, a member etched to have a non-etched portion for spot welding at both edge portions is used.

In another aspect, the present disclosure provides a method of manufacturing a de-mineralizer for a fuel cell equipped with a cartridge assembly which includes an external outer cartridge and an internal inner cartridge installed inside a housing filled with ion resin, the method including a forming a plate-shaped etching network having a plurality of perforated fine holes; joining a non-etched portion in which fine holes are not formed by winding the plate-shaped etching network in a cylindrical shape; and forming the inner cartridge and the outer cartridge, by performing the injection molding of a frame for supporting the etching network on the outer circumferential surface of the etching network bonded to non-etched portion.

Specifically, during etching step of perforating the fine holes, the fine holes may be perforated while leaving the non-etched portion for spot welding on both side edge portions of the thin plate member, and the sizes of the fine holes may be differently formed from one side to the other side in a vertical direction of the thin plate member to improve the flow rate distribution of the cooling water, or the fine holes having the same sizes may be differently distributed.

It is understood that the term "vehicle" or "vehicular" or other similar term as used herein is inclusive of motor vehicles in general such as passenger automobiles including sports utility vehicles SUV, buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles e.g. fuels derived from resources other than petroleum. As referred to herein, a hybrid vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, preferred embodiments of the present disclosure will be described with reference to the accompanying drawings.

The present disclosure relates to a cartridge assembly of a de-mineralizer for a fuel cell. In particular, it relates to a structure for the prevention of ion resin leakage and an improvement of the cooling water flow rate distribution of the inner cartridge that is disposed inside of the cartridge assembly.

In the present disclosure, by using a thin plate-shaped etching network which forms a pattern, the ionic resin leakage problems in the de-mineralizer due to the etching network welding failure may be addressed. It may be possible to effectively improve the cooling water flow rate distribution in the de-mineralizer.

Figure 3:
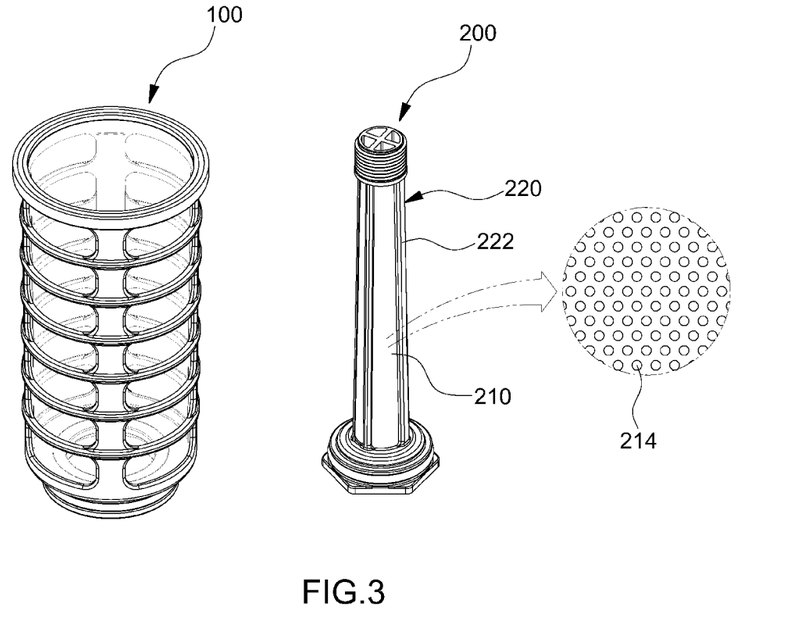
FIG. 3 is a diagram showing the cartridge assembly of the de-mineralizer according to an embodiment of the present disclosure.

As shown in FIG. 3, a cartridge assembly of the de-mineralizer according to an embodiment of the present disclosure may be configured to include an external outer cartridge 100 and an internal inner cartridge 200.

Although not represented in the drawings, the cartridge assembly serves to support ion resin filled in the de-mineralizer housing having a cooling water inlet and outlet, prevent leakage, and distribute the flow of the cooling water.

Figure 4:
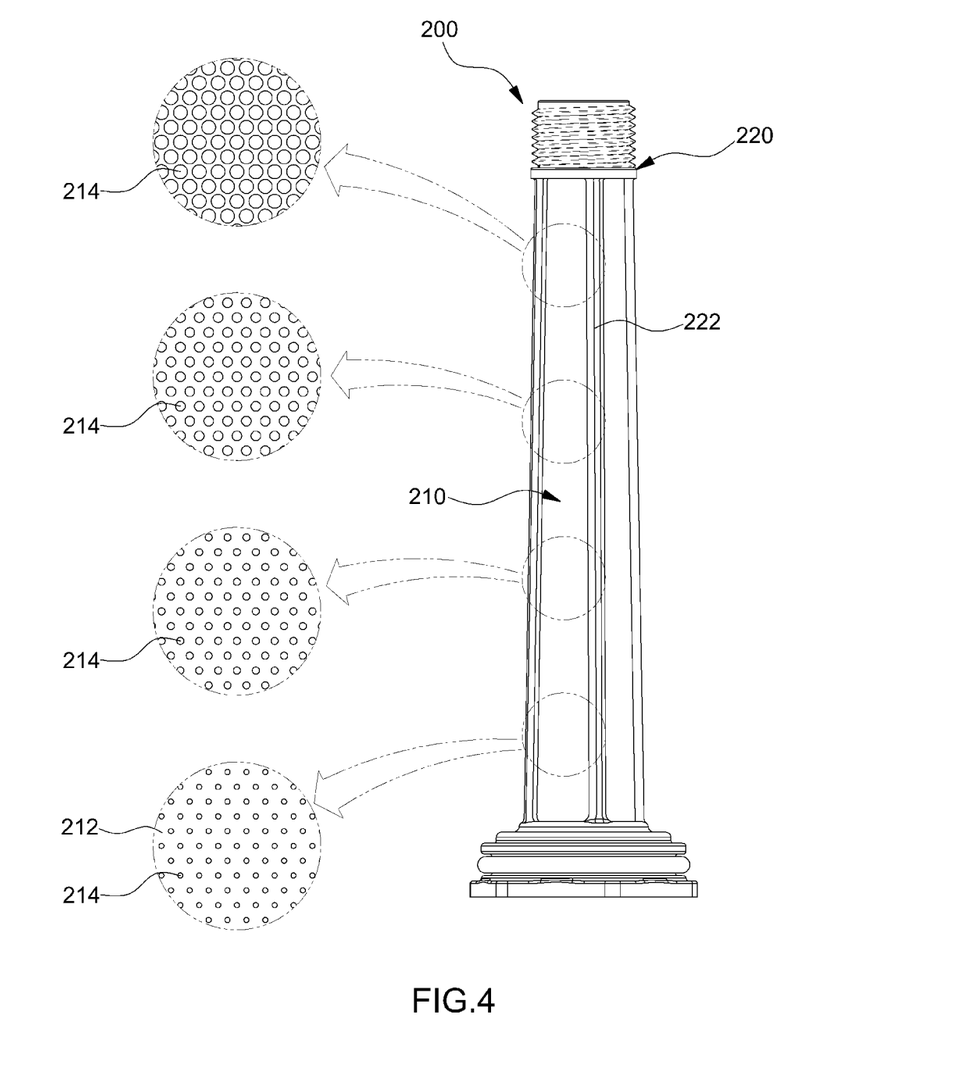
FIG. 4 is an enlarged view showing an etching network of the inner cartridge of the cartridge assembly of the de-mineralizer according to an embodiment of the present disclosure.
Figure 5:
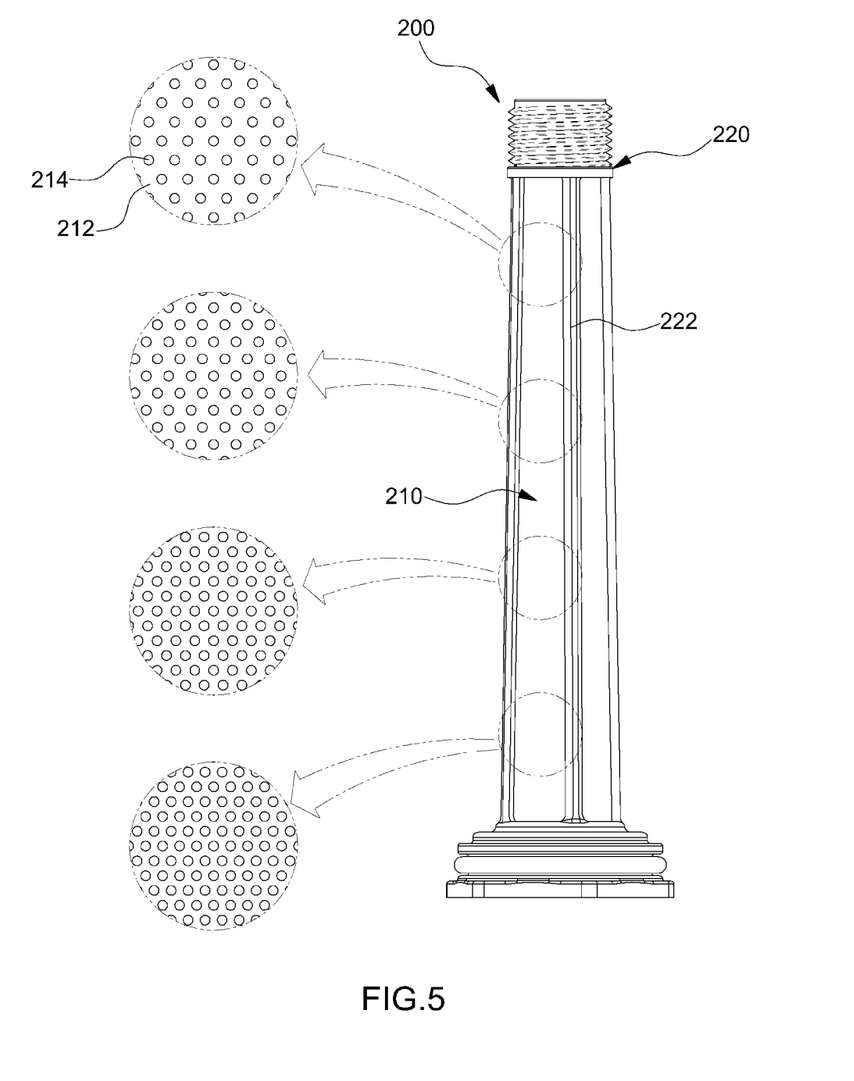
FIG. 5 is an enlarged view showing an etching network of the inner cartridge of a cartridge assembly of a de-mineralizer according to another embodiment of the present disclosure.

As shown in FIGS. 4 and 5, the inner cartridge 200 has an etching network 210 formed with a plurality of fine holes 214, and a frame 220 formed on an outer circumferential surface of the etching network 210 to support the etching network 210.

The etching network 210 is formed by winding a thin plate member 212 having perforated fine holes 214 in a cylindrical shape, and at least one of the size and distribution of the fine holes 214 is differently formed depending on each position of the cooling water entering direction (i.e., a vertical direction of the inner cartridge or a vertical flow direction of the cooling water in the cartridge assembly) in the inner cartridge 200, thereby allowing a uniform distribution of cooling water over the entire area of the inner cartridge 200.

Referring to FIG. 4, in the etching network 210, since the cooling water flows into an opposite upper side from a lower side (close to the cooling water inlet side of the housing) based on the vertical direction of the inner cartridge 200, and the etching network 210 has a pattern in which the size of the fine holes 214 increases in the entering direction (i.e., in the direction from one side to the other side of the upper and lower sides of the etching network) of the cooling water flowing into the inner cartridge 200, the flow rate distribution of cooling water is thereby improved.

Referring to FIG. 5, the etching network 210 is formed with the fine holes 214 having generally the same size, having a pattern in which the distribution of the fine holes 214 increases from one side to the other side of the upper and lower sides of the etching network 210 based on the entering direction of the cooling water flowing into the inner cartridge 200, improving the flow rate distribution of cooling water.

In this way, when the flow rate distribution of the cooling water is improved by differentiating the size of the fine holes 214 formed in the etching network 210 of the inner cartridge 200 or by differentiating the distribution of the fine holes 214 of the same size, it is possible to remove a horizontal frame portion that serves as the flow rate distribution function of the cooling water in the existing inner cartridge for a de-mineralizer.

Thus, the passage area of the cooling water increases due to the deletion of the existing horizontal frame portion, thereby achieving an increase in the flow rate of the cooling water and an improvement in filtering efficiency, in addition to a decrease in differential pressure of the cooling water.

Further, since the horizontal frame portion is omitted and only a vertical frame portion 222 is molded during the injection molding of the frame 222 of the inner cartridge 200, it is also possible to achieve a simplification of the metal mold, a filter weight reduction and a cost reduction, due to the simplification of the frame structure.

A method of manufacturing the inner cartridge of the present disclosure based on the above-described structure will be described as follows.

First, a plurality of fine holes 214 are perforated (etched) in the thin plate member 212 having a thin thickness in a fixed pattern to form a plate-shaped etching network 210.

For the efficient and uniform distribution of the cooling water flow rate, the sizes of the fine holes 214 are differently formed from one side to the other side of the upper and lower sides of the thin plate member 212, or the fine holes 214 having the same size are differently distributed from one side to the other side of the upper and lower sides of the thin plate member 212, thereby forming a plate-shaped etching network 210 perforated in a uniform pattern.

Next, a plate-shaped etching network 210 drilled in a fixed pattern is wound in a cylindrical shape and is joined so as to be fixed, and at this time, joins the non-etched portion 216 in which the fine holes 214 are not formed.

Figure 6:
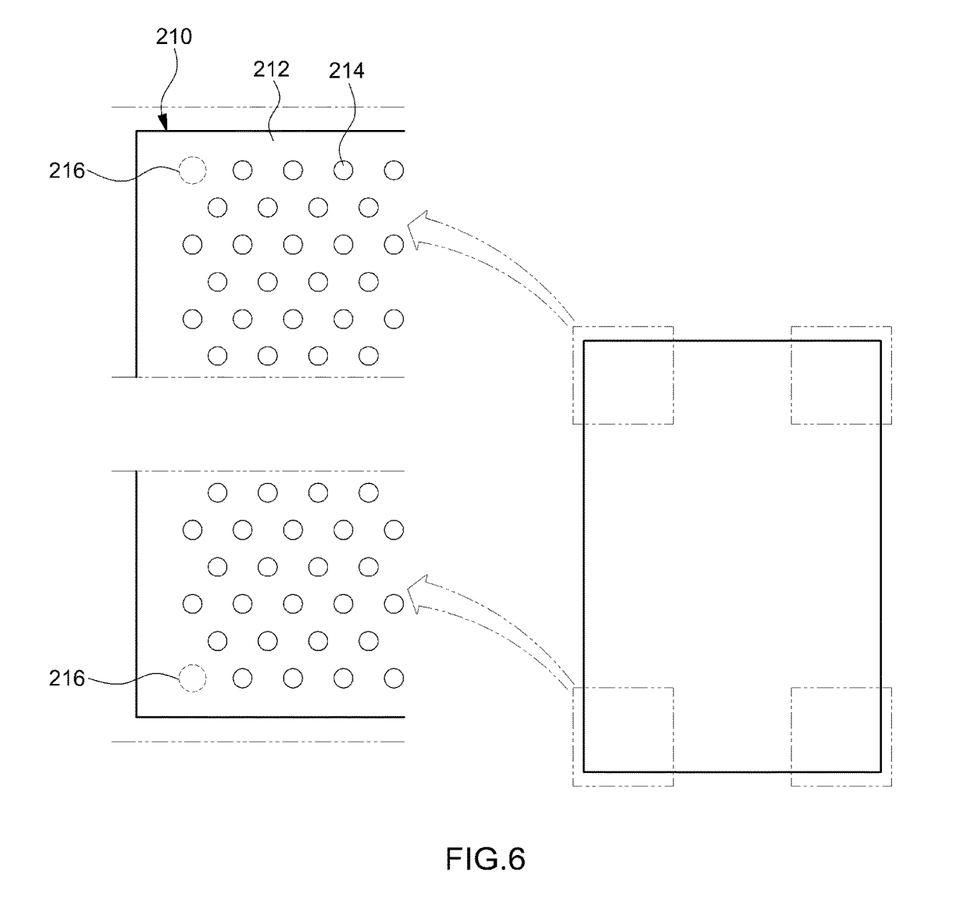
FIG. 6 is an enlarged view showing a welding part (non-etched portion) of the etching network according to the embodiment of the present disclosure.

Therefore, in the etching process for drilling the fine holes 214 in the thin plate member 212, as shown in FIG. 6, the fine holes 214 are perforated in the other regions, while leaving (or forming) the non-etched portion 216 in which the fine holes 214 are not intentionally formed as a region for spot welding on both side edges of the thin plate member 212.

After the etching network 210 with the non-etched portion 216 is inserted and seated into a metal mold, resin for molding the frame is injected into the outer circumferential surface of the etching network 210 at a high pressure, thus performing the injection molding of the frame 220 for supporting the etching network 210 to form the inner cartridge 200.

By performing the etching while separately leaving the non-etched portion 216 for the spot welding as described above, the spot welding is smoothly performed and the injection failure of the frame 220 is prevented, thereby improving the leakage of the ion resin.

In addition, the structure of the inner cartridge 200 and the method of manufacturing the same as described above may also be similarly applied to the outer cartridge 100.

Although it is not shown in the drawings, the etching network having a plurality of fine holes may be applied to the outer cartridge 100 instead of deleting the conventional horizontal frame portion like the inner cartridge 200. At least one of the size and distribution of the fine holes may be differently formed depending on each position in the entering direction of the cooling water (specifically, the vertical direction of the outer cartridge or the vertical flow direction of the cooling water in the cartridge assembly) in the outer cartridge 100.

According to the de-mineralizer for a fuel cell according to the present disclosure, the fine holes are intentionally joined through the non-etched portion when joining the etching network by being wound in a cylindrical shape in the manufacturing process of the inner cartridge for the de-mineralizer. Thus, the leakage of ion resin due to joining failure of the conventional mesh network is prevented, and by providing a difference in size and distribution in the fine holes of the etching network instead of removing the horizontal frame portion of the conventional inner cartridge, the flow rate distribution of the cooling water is improved, the durability of the de-mineralizer is improved, and it is also possible to reduce the differential pressure of the cooling water and improve filtering efficiency.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A de-mineralizer for a fuel cell comprising:
a cartridge assembly including an external outer cartridge and an internal inner cartridge installed inside a housing filled with ion resin;
wherein at least one of the inner cartridge and the outer cartridge includes an etching network formed by winding a plate-shaped thin plate member which has a plurality of fine holes, and
wherein in the thin plate member, at least one of a size and distribution of the fine holes is formed differently depending on the respective positions based on a vertical flow direction of the cooling water, and a plurality of frames, each of which having a pole shape, are vertically formed on an outer circumferential surface of the etching network from a top portion to a bottom portion of the etching network to support the etching network.

2. The de-mineralizer for a fuel cell of claim 1, wherein the etching network has a pattern in which the size of the fine holes increases in the vertical flow direction of the cooling water in the cartridge assembly.

3. The de-mineralizer for a fuel cell of claim 1, wherein the etching network has a pattern in which the distribution of the fine holes having the same size increases in the vertical flow direction of the cooling water in the cartridge assembly.

4. The de-mineralizer for a fuel cell of claim 1, wherein the etching network is formed by winding the thin plate member having a plurality of perforated fine holes in a cylindrical shape, and the thin plate member has a non-etched portion for spot welding at both edge portions.

5. A method of manufacturing a de-mineralizer for a fuel cell equipped with a cartridge assembly including an external outer cartridge and an internal inner cartridge installed inside a housing filled with ion resin, the method comprising:

forming a plate-shaped etching network by winding a thin plate member having a plurality of perforated fine holes and a non-etched portion in which the fine holes are not formed;
joining the non-etched portion by winding the plate-shaped etching network in a cylindrical shape and then by spot welding only the non-etched portion; and
forming the inner cartridge and the outer cartridge, by performing injection molding of a plurality of frames for supporting the etching network on the outer circumferential surface of the etching network bonded to the non-etched portion,
wherein each of the plurality of frames has a pole shape and is vertically formed on the outer circumferential surface of the etching network from a top portion to a bottom portion of the etching networking.

6. The method of claim 5, wherein the fine holes are perforated while leaving the non-etched portion for spot welding on both side edge portions of the thin plate member.

7. The method of claim 5, wherein the sizes of the fine holes are differently formed from one side to the other side in a vertical direction of the thin plate member.

8. The method of claim 5, wherein the fine holes having the same size are differently distributed from one side to the other side of upper and lower sides of the thin plate member.

9. A de-mineralizer for a fuel cell comprising:
a cartridge assembly including an external outer cartridge and an internal inner cartridge installed inside a housing filled with ion resin;
wherein at least one of the inner cartridge and the outer cartridge includes an etching network formed with a thin plate member in which a plurality of fine holes are perforated,
wherein, in the thin plate member, at least one of a size and distribution of the fine holes is formed differently depending on the respective positions based on a vertical flow direction of the cooling water,
wherein the de-mineralizer further includes a frame formed on an outer circumferential surface of the etching network to support the etching network, and
wherein the frame includes:
an upper frame member provided at an upper end portion of the etching network to support the upper end portion of the etching network;
a lower frame member provided at a lower end portion of the etching network to support the lower end of the etching network; and
a plurality of vertical frame members, each of which having a pole shape and vertically formed on the outer circumferential surface of the etching network from a top portion to a bottom portion of the etching networking, connecting the upper frame member and the lower frame member between the upper frame member and the lower frame member to support a side portion of the etching network, without including any horizontal frame member between the upper frame member and the lower frame member.

* * * * *